(12) United States Patent
Joshi et al.

(10) Patent No.: US 12,107,857 B2
(45) Date of Patent: Oct. 1, 2024

(54) MULTICAST TRAFFIC SEGMENTATION IN AN OVERLAY NETWORK

(71) Applicant: Hewlett Packard Enterprise Development LP, Spring, TX (US)

(72) Inventors: Vinayak Joshi, Bangalore (IN); Tathagata Nandy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/103,341

(22) Filed: Jan. 30, 2023

(65) Prior Publication Data

US 2024/0259373 A1   Aug. 1, 2024

(51) Int. Cl.
| | | |
|---|---|---|
| *H04L 45/02* | (2022.01) | |
| *H04L 9/40* | (2022.01) | |
| *H04L 29/06* | (2006.01) | |
| *H04L 47/70* | (2022.01) | |
| *H04L 47/80* | (2022.01) | |

(52) U.S. Cl.
CPC .............. *H04L 63/10* (2013.01); *H04L 45/02* (2013.01); *H04L 47/70* (2013.01); *H04L 47/80* (2013.01); *H04L 63/02* (2013.01); *H04L 63/102* (2013.01)

(58) Field of Classification Search
CPC ......... H04L 45/02; H04L 45/42; H04L 47/70; H04L 47/80; H04L 63/02; H04L 63/0227; H04L 63/0245; H04L 63/10; H04L 63/102

See application file for complete search history.

(56) References Cited

U.S. PATENT DOCUMENTS

| | | | | |
|---|---|---|---|---|
| 9,787,488 | B1* | 10/2017 | Rainovic | H04L 47/70 |
| 2001/0053696 | A1* | 12/2001 | Pillai | H04L 45/42 |
| | | | | 455/445 |
| 2006/0098607 | A1* | 5/2006 | Zeng | H04L 45/16 |
| | | | | 370/349 |
| 2009/0201844 | A1* | 8/2009 | Bhatti | H04W 4/06 |
| | | | | 370/312 |
| 2011/0173334 | A1* | 7/2011 | Shah | H04L 67/288 |
| | | | | 709/228 |
| 2015/0263953 | A1* | 9/2015 | Sasaki | H04L 63/102 |
| | | | | 370/392 |

(Continued)

OTHER PUBLICATIONS

Sangli et al., "BGP Extended Communities Attribute", Request for Comments: 4360, Feb. 2006, 12 pages.

*Primary Examiner* — Boris D Grijalva Lobos
(74) *Attorney, Agent, or Firm* — Yao Legal Services, Inc.

(57) ABSTRACT

A system for enforcement of a set of segmentation policies at a gateway switch of a network is provided. Here, the segmentation policies can indicate which other roles are allowed to communicate with a respective role, which can indicate a set of privileges in the network. During operation, the switch can receive a first message associated with a join request for a multicast group from a host. The switch can also receive a second message comprising data from a source of the multicast group. The first and second messages can indicate first and second roles, respectively, of the host and source. Based on the first and second roles and a corresponding segmentation policy, the system can determine whether the host is allowed to receive the data from the source. If not allowed, the system can prevent the second message from being forwarded to the host from the gateway switch.

15 Claims, 11 Drawing Sheets

(56) References Cited

U.S. PATENT DOCUMENTS

| | | | |
|---|---|---|---|
| 2016/0112427 A1* | 4/2016 | Vyas | H04L 63/105 |
| | | | 726/4 |
| 2019/0132280 A1* | 5/2019 | Meuninck | H04L 69/321 |
| 2019/0141124 A1* | 5/2019 | Zhang | H04L 49/201 |
| 2022/0417287 A1* | 12/2022 | Joshi | H04L 63/20 |
| 2023/0069306 A1* | 3/2023 | Majila | H04L 45/30 |
| 2023/0089819 A1* | 3/2023 | Majila | H04L 63/0876 |
| | | | 726/1 |

* cited by examiner

MULTICAST TRAFFIC SEGMENTATION IN AN OVERLAY NETWORK

FIELD

The present disclosure relates to communication networks. More specifically, the present disclosure relates to a method and system for efficiently segmenting multicast traffic in an overlay network, which may include one or more distributed tunnel fabrics.

BRIEF DESCRIPTION OF THE FIGURES

In the figures, like reference numerals refer to the same figure elements.

DETAILED DESCRIPTION

Figure 1A:
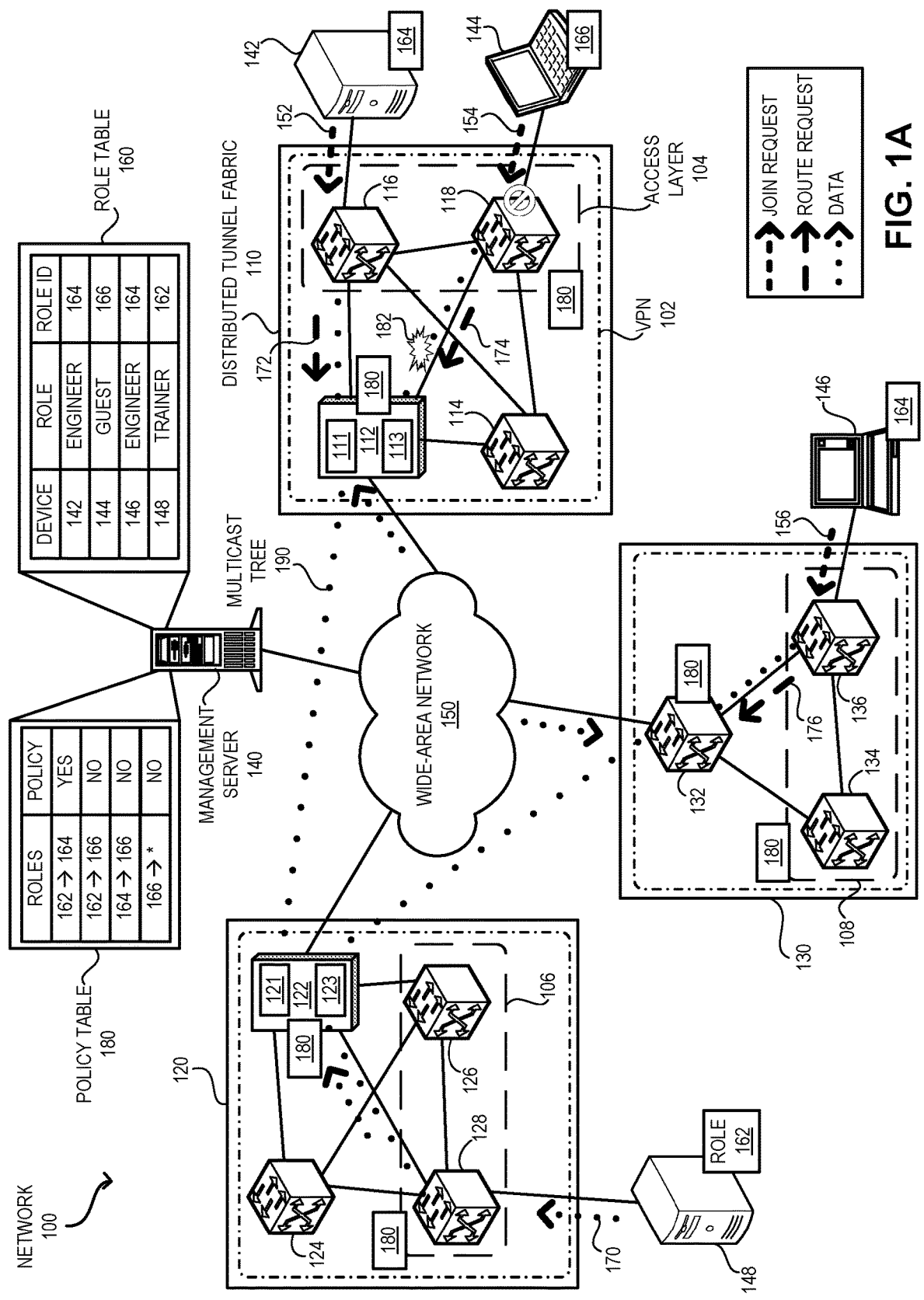
FIG. 1A illustrates an example of efficient intra-fabric multicast traffic segmentation in an overlay network, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support an overlay network formed based on tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric. A gateway of the fabric can be a virtual gateway switch (VGS) shared among a plurality of participating switches.

Role-based segmentation can facilitate the separation of traffic in a network based on roles (e.g., a guest is not allowed to communicate with an engineer). Typically, the definitions that define the roles in the network and the policies controlling the inter-role traffic are maintained at the access (or edge) switches. A respective end device, such as end devices or hosts and servers, can be coupled to the overlay network via an access switch. In this way, the access switches can form an access layer of the overlay network. Because a gateway switch in the overlay network may not be aware of the roles of a requesting host, the gateway switch may not be able to enforce the corresponding segmentation policies. As a result, efficiently segmenting multicast traffic in the overlay network, which can be formed with a set of fabrics coupled to each, can be challenging.

The aspects described herein solve the problem of efficiently segmenting multicast traffic in an overlay network by (i) providing segmentation policies to a respective gateway switch; (ii) incorporating role information of the requesting host and source of a multicast group into the control and data packets, respectively; and (iii) pruning the multicast route to the host for the multicast group in the overlay network based on the role information and the segmentation policies. Here, a respective switch on the multicast route can become aware of the roles of the host and the source when the switch receives a control packet (e.g., a join request) and a data packet (e.g., an initial data packet), respectively. The switch can then determine whether the host is allowed to receive traffic from the source based on the segmentation policies and prune a multicast route to the requesting host if no valid host is reachable via the multicast route.

A distributed tunnel fabric of the overlay network can be coupled to other networks via the gateway switch, which can include a VGS, of the fabric. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-switch link (ISL). The VGS can be associated with one or more virtual addresses (e.g., a virtual Internet Protocol (IP) address and/or a virtual media access control (MAC) address). A respective tunnel formed at the VGS can use the virtual address to form the tunnel endpoint. As a result, other tunnel endpoints of the fabric can consider the VGS as the other tunnel endpoint for a tunnel instead of any of the participating switches.

To forward traffic toward the VGS, a tunnel endpoint of the fabric can perform a load balancing operation (e.g., based on hashing on a respective packet) and select one of the participating switches as the destination (i.e., as the other tunnel endpoint). The tunnel endpoint can then forward the packet via a tunnel between the tunnel endpoints. Hence, an endpoint may forward a multicast control packet to one of the participating switches, which in turn, can share the control packet with a peer participating switch via the ISL. If the fabric is a multi-fabric network, the fabric can be one of a plurality of fabrics forming the network. A respective fabric can then include a gateway switch, which can include a VGS, that can be coupled to a remote gateway switch of another fabric, an external network, or both.

For example, the gateway switch can be coupled to the remote gateway switch via an inter-fabric tunnel (i.e., a tunnel coupling two fabrics). A packet received at the gateway switch via an intra-fabric tunnel (i.e., a tunnel within a fabric) can be encapsulated with a tunnel header associated with the intra-fabric tunnel. The gateway switch can decapsulate the tunnel header and re-encapsulate the packet with another tunnel header associated with the inter-fabric tunnel. A respective switch operating as a tunnel endpoint in the overlay network can use a routing protocol, such as Border Gateway Protocol (BGP). In a multi-fabric overlay network, routes for intra-fabric tunnels can be determined by using internal BGP (iBGP) while the routes for inter-fabric tunnels can be determined by using internal BGP (eBGP).

To join a multicast group, a host can send a join request to the switch it is coupled to. The join request can be an Internet Group Management Protocol (IGMP) or a Multicast Listener Discovery (MLD) join request. A requesting switch (i.e., the switch coupling the requesting host) can receive the join request and create a corresponding route request for the overlay network. The route request can include the IP address of the source and the group address of the multicast group. For example, if the overlay network includes an EVPN network, the route request can be a Selective Multicast Route (SMET) route or a type-6 route for establishing routes toward the switch for distributing multicast traffic of the multicast group.

Subsequently, the requesting switch can forward the request to an upstream switch, such as the gateway switch of the local fabric, via the corresponding tunnel. Upon receiving the request, the gateway switch can establish a multicast route to the requesting switch for the multicast group if the route already does not exist. Establishing the route can include adding the tunnel (i.e., the route) to the multicast tree. If the source is reachable via another fabric, the gateway switch can relay the request to the remote gateway switch (e.g., based on an inter-fabric tunnel). The relaying may include changing from an iBGP route request to an eBGP route request. In this way, the request is forwarded to the source switch (i.e., the switch coupling the source). At each tunnel hop of the request in the overlay network, the tunnel to the downstream switch is added to the multicast tree of the multicast group. Here, the tunnel hop corresponds to the transmission of a packet via a tunnel where a tunnel encapsulation is initiated and terminated. When the source switch receives a data packet, the source switch can encapsulate the data packet and forward the encapsulated packet via its local tunnel in the multicast tree.

For supporting segmentation, the end devices, such as the source and the requesting host, can be associated with corresponding roles. With existing technologies, the access (or edge) switches, which can couple the end devices, can maintain a set of segmentation policies. A respective policy can indicate whether devices associated with one role are allowed to communicate with devices associated with another role. In other words, a respective policy can indicate which role pair is allowed to communicate with each other. Hence, the policies can control inter-role traffic in the overlay network. The policies can be defined by a user (e.g., a network administrator) at a management server, which in turn, can provide the definitions to the access switches. When an end device is coupled to the overlay network, the corresponding access switch can learn the role of the end device and enforce the segmentation based on the policies.

When the source switch receives the data packet, the source switch can include the role information, such as a role identifier or role tag, associated with the source into the encapsulation header of the data packet. For example, the source switch can use a Group Policy Option (GPO) tag of the encapsulation header to include the role identifier. The role information is propagated to a respective encapsulation header until the data packet reaches the requesting hosts. As a result, when the data packet is received at the requesting switch, the requesting switch can obtain the role information of the source from the encapsulation header. Since the requesting switch is also an access switch, the requesting switch can be aware of the role information of the requesting host and the policies associated with it. By comparing the role information of the source and the requesting host with the policies, the requesting switch can determine whether the requesting host is allowed to receive traffic from the source. If the inter-role communication is not allowed, the requesting switch can drop the packet.

Here, the definitions that define the roles in the overlay network and the policies controlling the inter-role traffic are maintained at the access switches (i.e., at the access layer). Accordingly, the gateway switches of the overlay network may not be aware of the policies. Furthermore, the route requests may not indicate the role of the requesting host. Hence, the gateway switches may not be able to enforce segmentation in the overlay network. As a result, if the requesting host is not allowed to receive traffic from the source, the multicast data packets are carried to the last-hop switch only to be dropped. Consequently, the packets can unnecessarily utilize the bandwidth in the overlay network.

To solve this problem, the segmentation policies of the overlay network can be provided to the gateway switches from the management server. When a host sends a join request for the multicast group, the access switch coupling the host can generate the corresponding route request and include the role identifier (or role tag) of the host in the header of the request. The header can be a tunnel encapsulation header associated with a tunnel between the access switch and the gateway switch of the fabric. Upon receiving the request via the tunnel, the gateway switch can obtain the role identifier of the host and add the role identifier to a role list of requesting hosts associated with the multicast group for the local ingress tunnel of the request.

The gateway switch can then relay the request to the upstream endpoint, which can be the gateway switch of another fabric. The relayed request can retain the role information of the requesting host. Upon receiving the request, the upstream endpoint can also add the role identifier to a role list of requesting hosts associated with the multicast group for the local ingress tunnel of the request. In this way, the request can be forwarded to the source switch. At each tunnel hop of the request in the overlay network, the role information is added to the corresponding role list. As a result, a respective switch in the multicast tree can maintain the role information of the requesting hosts reachable via a respective local tunnel on the multicast tree.

On the other hand, the source switch can continue to add the role information of the source in the encapsulation header of the data packets of the multicast group. As a result, when a switch on the multicast tree receives the data packet via a tunnel, the switch can become aware of the respective role information of both the source and requesting hosts. The switch can then determine whether all requesting hosts reachable via a local tunnel on the multicast tree are allowed to receive traffic from the source based on the role information and the policies. If at least one valid requesting host is not reachable via the tunnel, the switch can prune the tunnel from the multicast tree. Hence, the switch can forward the data packet via the tunnel only if at least one host associated with the tunnel is allowed to receive traffic from the source.

When a host sends a leave request, the requesting switch can receive the request and generate a corresponding route update. The requesting switch can include the role information in the update and forward the update to the upstream switch, such as the gateway switch of the fabric. The gateway switch can then determine whether all requesting hosts reachable via a local tunnel on the multicast tree are allowed to receive traffic from the source based on the role information and the policies. Without the leaving host, if at least one valid requesting host is not reachable via the tunnel, the gateway switch can prune the tunnel from the multicast tree. The gateway switch can then relay the update to the upstream switch of the multicast tree. Subsequently, the update is relayed to the source switch via the multicast tree. This can allow a respective switch receiving the update to prune the downstream tunnel when applicable. In this way, the pruning can efficiently enforce the segmentation policies by avoiding the unnecessary forwarding of multicast data packets.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of efficient intra-fabric multicast traffic segmentation in an overlay network, in accordance with an aspect of the present application. An overlay network 100 can include a number of switches and devices, and may include heterogeneous network components, such as layer-2 and layer-3 hops, and tunnels. In some examples, network 100 can be an Ethernet, InfiniBand, or other network, and may use a corresponding communication protocol, such as Internet Protocol (IP), FibreChannel over Ethernet (FCoE), or other protocol. Network 100 can include a plurality of distributed tunnel fabrics 110, 120, and 130. Hence, network 100 can be a multi-fabric network. Fabric 110 can include switches 111, 113, 114, 116, and 118; fabric 120 can include switches 121, 123, 124, 126, and 128; and fabric 130 can include switches 132, 134, and 136. A respective switch in a respective fabric can be associated with a MAC address and an IP address. In a respective fabric of network 100, switches can be coupled to each other via a tunnel.

In FIG. 1, a respective link denoted with a solid line between a switch pair can indicate a tunnel. Switches of a respective fabric in network 100 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a Border Gateway Protocol (BGP) peer. A VPN 102, such as an Ethernet VPN (EVPN), can be deployed over fabric 110. Similarly, respective instances of a VPN, which can be VPN 102, can be deployed over fabrics 120 and 130. Fabric 110 can include a VGS 112 that can be coupled to a VGS 122 of fabric 120 via a wide-area network (WAN) 150, such as an enterprise network or the Internet. VGS 102 and 108 can be coupled to gateway switch 132 of fabric 130 via network 150.

In fabric 110, switches 111 and 113 can operate as a single switch in conjunction with each other to facilitate VGS 112. Similarly, switches 121 and 123 can operate as a single switch in conjunction with each other to facilitate VGS 122 in fabric 120. VGS 112 can be associated with one or more virtual addresses (e.g., a virtual IP address and/or a virtual MAC address). A respective tunnel formed at VGS 112 can use the virtual address to form the tunnel endpoint. To efficiently manage data forwarding, switches 111 and 113 can maintain an ISL between them for sharing control and/or data packets. The ISL can be a layer-2 or layer-3 connection that allows data forwarding between switches 111 and 113. The ISL can also be based on a tunnel between switches 111 and 113 (e.g., a VXLAN tunnel).

Because the virtual address of VGS 102 is associated with both switches 113 and 113, other tunnel endpoints, such as switches 114, 116, and 118, of fabric 110 can consider VGS 112 as the other tunnel endpoint for a tunnel instead of switches 111 and 113. To forward traffic toward VGS 112 in fabric 110, a remote switch, such as switch 114, 116, or 118, can operate as a tunnel endpoint while VGS 112 can be the other tunnel endpoint. From a respective remote switch of fabric 110, there can be a set of paths (e.g., equal-cost multiple paths or ECMP) to VGS 112. For example, the ECMP can include a path to switch 111 and another path to switch 113. Hence, a respective path in the underlying network can lead to one of the participating switches of VGS 112. In the same way, VGS 122 can be associated with one or more virtual addresses. Other tunnel endpoints of fabric 120 can consider VGS 122 as the other tunnel endpoint for a tunnel instead of switches 121 and 123. From a respective remote switch of fabric 120, there can be a set of ECMP to VGS 122.

One or more switches of a respective fabric in network 100 can be coupled to one or more end devices. The switches coupling end devices can be access switches. The access switches of a respective fabric in network 100 can form an access layer in that fabric. In network 100, switches 116 and 118 can form an access layer 104 in fabric 110, switches 126 and 128 can form an access layer 106 in fabric 120, and switches 136 and 138 can form an access layer 108 in fabric 130. In this example, end devices 142, 144, 146, and 148 can be coupled to switches 116, 118, 136, and 128, respectively. Suppose that end device 148 is the source for a multicast group. On the other hand, end devices 142, 144, and 144 can be hosts requesting traffic belonging to the multicast group. Hence, end devices 142, 144, 146, and 148 can also be referred to as hosts 142, 144, and 146, and source 148, respectively.

To receive multicast data from source 148, hosts 142, 144, and 146 can send multicast join requests 152, 154, and 156, respectively (e.g., IGMP/MLD joins). Switches 116, 118, and 136 can receive join requests 152, 154, and 156, respectively. Hence, switches 116, 118, and 136 can be referred to as requesting switches. Upon receiving join request 152, switch 116 can receive join request 152 and create a corresponding route request 172 (e.g., an EVPN SMET or type-6 route). Request 172 can include the IP address of source 148 and the group address of the multicast group. Switch 116 can then forward request 172 to an upstream switch, such as gateway switch 112 of fabric 110, via the corresponding tunnel. Upon receiving request 172, switch 112 can establish a multicast route to switch 116 for the multicast group if the route already does not exist. Establishing the route can include adding the ingress tunnel between switches 112 and 116 to a multicast tree 190 of the multicast group.

In network 100, source 148 is reachable via fabric 120. Hence, switch 112 can relay request 172 to a remote gateway switch 122 by changing from an iBGP route request to an eBGP route request. Subsequently, switch 122 relays request 172 to source switch 128. At each tunnel hop of request 172 in network 100, the tunnel is added to multicast tree 190. Similarly, based on requests 174 and 176 corresponding to join requests 154 and 156, respectively, the respective ingress tunnels are added to multicast tree 190. Requests 174 and 176 can travel to switch 128, thereby adding a respective tunnel hop to multicast tree 190. If a tunnel is already in multicast tree 190, that tunnel may not be added again. When switch 128 receives a data packet 170, switch 170 can encapsulate packet 170 and forward encapsulated packet 170 via its local tunnel in multicast tree 190. In this way, multicast routes of multicast tree 190 are established in network 100. Multicast tree 190 can then be used for distributing the data stream of the multicast group. It should be noted that a multicast route can be added to multicast tree 190 after source 148 has started the data stream.

However, if network 100 can support role-based segmentation of traffic, such segmentation can be applicable to multicast traffic distribution as well. For example, network 100 can define roles "trainer," "engineer," and "guest" for devices coupling network 100. Roles "trainer," "engineer," and "guest" can be associated with role identifiers 162, 164, and 166, respectively. Management server 140, which may also be an authentication server, can maintain a set of segmentation policies in a local data structure, which can be referred to as policy table 180. A respective policy can indicate whether traffic from a role is allowed to be sent to another role based on corresponding role identifiers. For example, table 180 can include policies that can indicate that traffic from role identifier 162 is allowed to be forwarded to role identifier 164. Here, traffic to and from a role identifier can indicate traffic to and from a device with the role identifier. Furthermore, the policies can also include that with role identifier 166 is not allowed to receive traffic from role identifiers 162 and 164, and is not allowed to send traffic to any other role identifier. An instance of table 180 can be maintained at a respective switch of the access layer of a respective fabric in network 100. If table 180 is updated at server 140, the update is propagated to a respective instance of table 180.

If an end device, such as end device 142, belonging to an engineer is coupled to network 100, the user of end device 142 can authenticate using the user's credentials with management server 140. Based on the credentials, server 140 can determine that end device 142 is an engineer's device based on the credentials of the user. Accordingly, server 140 can allocate a role identifier 164 to end device 142, and store a mapping between end device 142 and role identifier 164 in a local role table 160. The mapping may also indicate the title (or definition) of the role (e.g., "engineer"). Suppose that end devices 144, 146, and 148 are associated with roles "guest," "engineer," and "trainer," respectively. Accordingly, server 140 can allocate role identifiers 166, 164, and 162 to end devices 144, 146, and 148, respectively. Server 140 can then store these mappings in table 160.

With existing technologies, when switch 128 receives packet 170 from source 148, switch 128 can encapsulate packet 170, include role identifier 162 in the encapsulation header of packet 170, and forward encapsulated packet 170 via multicast tree 190. Switch 128 can use a GPO tag of the encapsulation header to include role identifier 162. When switch 122 receives the encapsulated packet via multicast tree 190, switch 122 can decapsulate the encapsulation header. Switch 122 can re-encapsulate packet 170 with a new encapsulation header associated with an inter-fabric tunnel, include role identifier 162 in the new encapsulation header, and forward encapsulated packet 170 via multicast tree 190. In this way, role identifier 162 is propagated to a respective encapsulation header until encapsulated packet 170 reaches switches 116, 118, and 136. These switches can obtain role identifier 162 from the encapsulation header.

Since switches 116, 118, and 136 are also access switches in respective access layers, these switches can be aware of role identifier 162 and policies associated with role identifier 162. By comparing role identifier 162 with the policies, switches 116, 118, and 136 can determine whether the local requesting hosts are allowed to receive traffic from source 148. For example, switch 118 can determine that host 144 is assigned with a role identifier 162 associated with a role "guest." Accordingly, switch 166 can determine from table 180 that, since role identifier 166 is not allowed to receive traffic from role identifier 162, host 144 is not allowed to receive packet 170. On the other hand, switches 116 and 136 can determine from table 180 that, since role identifier 164 is allowed to receive traffic from role identifier 162, hosts 142 and 146, respectively, are allowed to receive packet 170.

Here, respective instances of table 180 are maintained at access layers 104, 106, and 108. Accordingly, gateway switches 112, 122, and 132 may not be aware of the policies defined in table 180. Furthermore, route requests 172, 174, and 176 may not indicate respective roles 164, 166, and 164 of requesting hosts 142, 144, and 146, respectively. Hence, gateway switches 112, 122, and 132 may not be able to enforce segmentation in network 110. As a result, if a requesting host, such as host 144, is not allowed to receive traffic from source 148, packet 170 can be carried to switch 118 only to be dropped. Consequently, data packets associated with the multicast group can unnecessarily utilize the bandwidth on the links and nodes on multicast tree 190.

To solve this problem, server 140 can distribute table 180 to gateway switches 112, 122, and 132. Furthermore, a respective route request or route update in network 100 can include the role identifier associated with the requesting host. For example, upon receiving join request 152 from host 142, switch 116 can include role identifier 164 of host 142 in request 172. Similarly, switch 118 can include role identifier 166 of host 144 in request 174. When switch 112 receives requests 172 and 174, switch 112 can learn the respective roles of the downstream requesting hosts. As a result, when switch 112 receives encapsulated packet 170 and learns role identifier 162 of source 148 from a GPO tag of the encapsulation header, switch 112 can determine whether to forward packet 170 via a downstream tunnel base on the learned roles and policies indicated in table 180.

For example, if switch 112 can determine that host 144 is associated with role identifier 166 and is not allowed to receive traffic from role identifier 162, switch 112 can determine that there is no other valid requesting host reachable via the tunnel between switches 112 and 118. Switch 112 can then prune the tunnel from multicast tree 190 (pruning operation 182). In addition, switch 112 may include the list of roles associated with all current requesting hosts reachable via switch 112 in a route request. Suppose that switch 112 receives request 174 after receiving request 172. Since both hosts 142 and 144 are reachable from switch 122 via switch 112, switch 112 may include both roles 164 and 166 while relaying request 174 (and any subsequent request) to switch 122. As a result, when switch 122 receives request 174, switch 122 can be aware of the respective roles of all requesting hosts. If two downstream requesting hosts have the same role, switch 112 may include role information associated with both hosts in a request.

In this way, switch 112 can prevent the forwarding of data traffic of the multicast group to switch 118. However, since role identifier 164 is allowed to receive traffic from role identifier 162, switch 112 can forward encapsulated packet 170 to switch 116. Therefore, the tunnel between switches 112 and 116 can remain in multicast tree 190. Furthermore, since at least one valid requesting host, such as host 142, is reachable via switch 112, its upstream tunnels in multicast tree 190 are not pruned. Similarly, since at least one valid requesting host, such as host 146, is reachable via switch 132, its upstream tunnels in multicast tree 190 are also not pruned. Here, a valid requesting host can be a host with a role that is allowed to receive traffic from the source role, which is associated with role identifier 162 in this example. By pruning tunnels that do not facilitate reachability to at least one valid requesting host, switches of network 100 can efficiently enforce segmentation policies.

When multicast tree 190 is formed based on requests 172, 174, and 176, a respective switch in network 100 may maintain the information associated with the local tunnels in the software. For example, the EVPN routes forming multicast tree 190 can be maintained by the multicast daemon on the operating system in the memory of the switch. When data packet 170 is received, a switch, such as switch 112, can program the next-hop tunnel into the forwarding hardware of switch 112. Accordingly, when switch 112 receives request 172, switch 112 can add the tunnel between switches 112 and 116 as the EVPN route in multicast tree 190 in the software. The EVPN route can be programmed in the application-specific integrated circuit (ASIC) of switch 112 upon receiving the first data packet, such as packet 170. However, if switch 112 can perform pruning operation 182 in the software, switch 112 can avoid programming the tunnel between switches 112 and 116 in the ASIC as the next-hop tunnel.

Figure 1B:
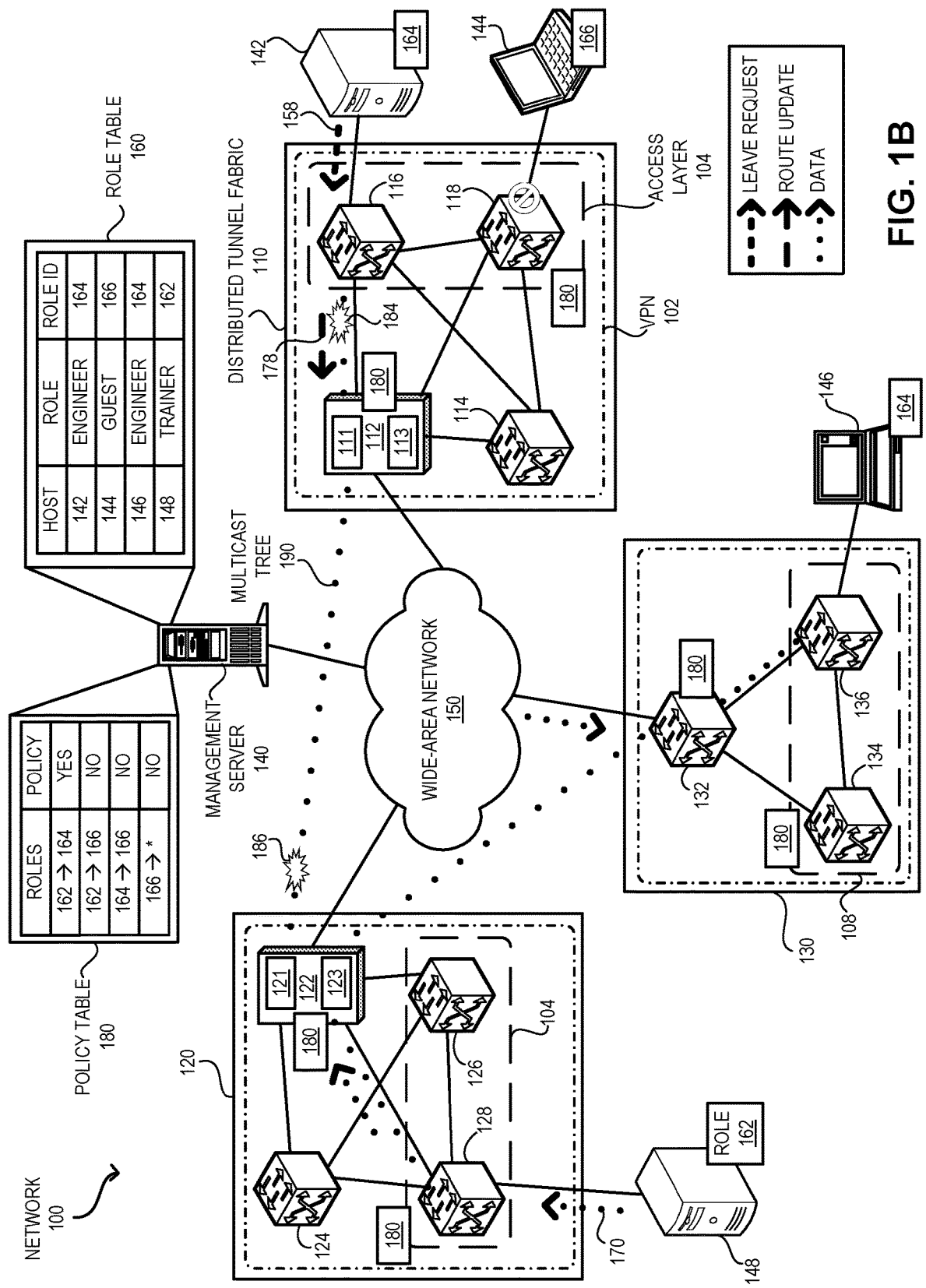
FIG. 1B illustrates an example of efficient inter-fabric multicast traffic segmentation in an overlay network, in accordance with an aspect of the present application.

FIG. 1B illustrates an example of efficient inter-fabric multicast traffic segmentation in an overlay network, in accordance with an aspect of the present application. If a host, such as host 142, intends to leave the multicast group, host 142 can send a leave request 158 to switch 116. Switch 116 can receive leave request 158 and generate a corresponding route update 178. Switch 116 can include role identifier 164 of host 142 and forward update 178 to gateway switch 110. Switch 112 can then determine whether all requesting hosts reachable via the tunnel between switches 112 and 116 are allowed to receive traffic from source 148 based on the policies in table 180. Since no valid requesting host other than leaving host 142 is reachable via the tunnel, switch 112 can prune the tunnel from multicast tree 190 (pruning operation 184). If switch 112 can perform pruning operation 184 in the software, switch 112 can avoid programming the tunnel between switches 112 and 118 in the ASIC as the next-hop tunnel.

Switch 112 can then relay update 178 to the upstream switch, such as switch 122, of multicast tree 190. Relayed update 178 can include role identifier 164 of host 144. Upon receiving update 178, switch 122 can determine that, other than leaving host 142, only host 144 is reachable via the tunnel between switches 112 and 122. However, since role identifier 166 is not allowed to receive traffic from role identifier 162, switch 122 determines that no valid requesting host is reachable via the tunnel. Hence, switch 122 can prune the tunnel from multicast tree 190 (pruning operation 186). Pruning operation 186 can include removing the tunnel between switches 112 and 122 from the ASIC as the next-hop tunnel as well as removing it from multicast tree 190 in the software.

However, since host 146 with role identifier 164 can be reachable via the tunnel between switches 122 and 128, switch 128 may not prune the tunnel in response to receiving update 178. Instead, switch 128 can determine that at least one valid requesting host is reachable via the tunnel and hence, the tunnel should not be pruned. In this way, the upstream propagation of update 178 can allow a respective switch receiving update 178 to prune the ingress tunnel if no valid requesting host other than leaving host 142 is reachable via the tunnel. Pruning operations 184 and 186 can efficiently enforce the segmentation policies by avoiding the unnecessary forwarding of multicast data packets in network 100.

Figure 2A:
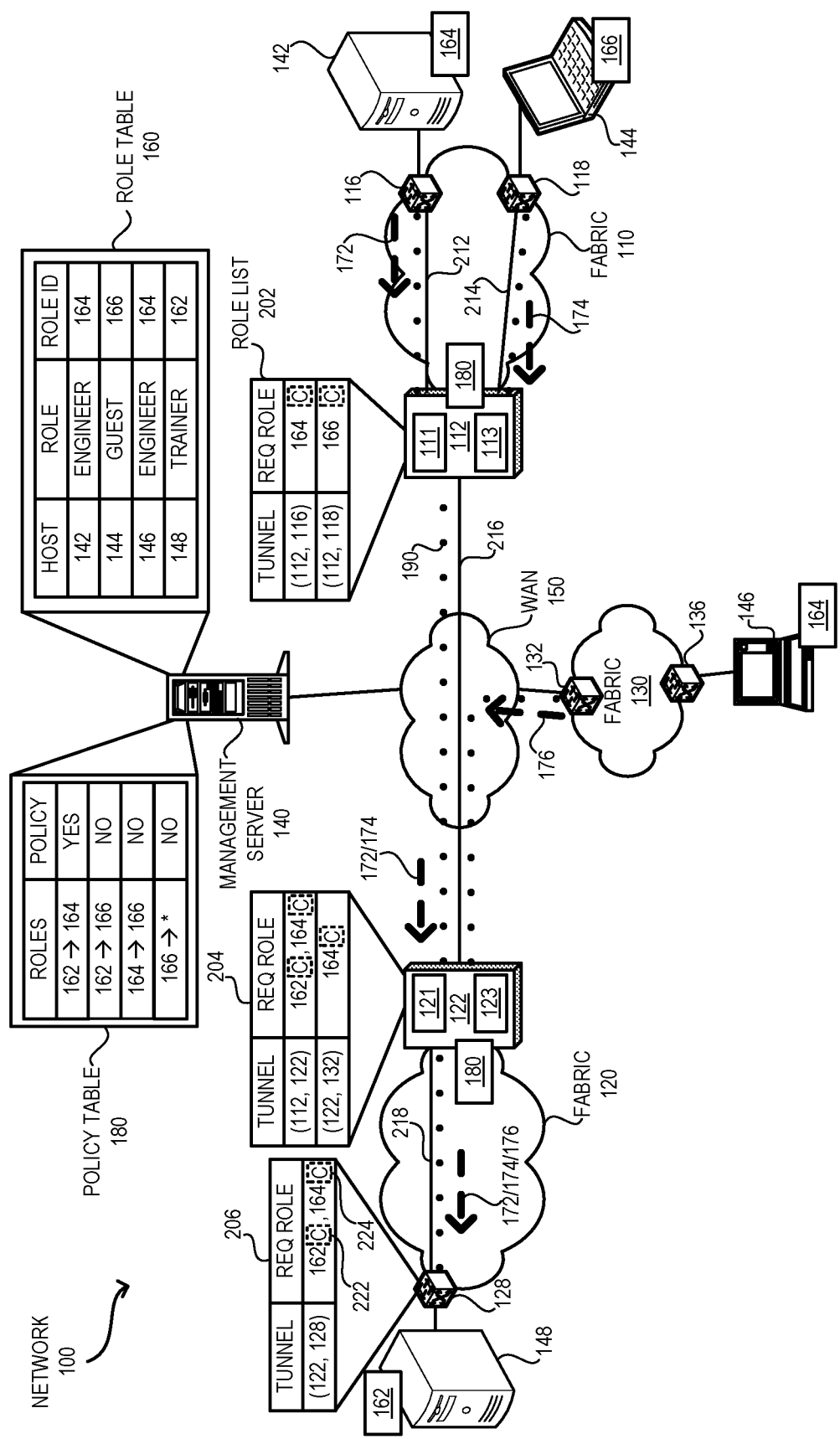
FIG. 2A illustrates an example of generating role lists for facilitating multicast traffic segmentation based on multicast route updates, in accordance with an aspect of the present application.

To determine whether no valid requesting host is reachable via a tunnel, a respective switch on multicast tree 190 can maintain role list for all requesting roles reachable through the tunnel. FIG. 2A illustrates an example of generating role lists for facilitating multicast traffic segmentation based on multicast route updates, in accordance with an aspect of the present application. Switches 112, 122, and 128 can maintain role lists 202, 204, and 206, respectively, to indicate the requesting hosts reachable via local tunnels in multicast tree 190. Since individual multicast groups may have different multicast trees, the switches in network 100 may maintain different role lists for different multicast groups. Hence, role lists 202, 204, and 206 can be associated with the multicast group of multicast tree 190.

Upon receiving route request 172 via tunnel 212 between switches 112 and 116, switch 112 can obtain role identifier 164 from request 172 and add role identifier 164 to role list 202 in association with a tunnel identifier of tunnel 212. Similarly, switch 112 can obtain role identifier 166 of host 144 from request 174 and add role identifier 166 to role list 202 in association with a tunnel identifier of tunnel 214 between switches 112 and 118. Hence, a respective entry of role list 202 can include a tunnel identifier of a local tunnel, such as tunnel 212 or 214, and the roles reachable via that tunnel. The tunnel identifier can include the IP address pair of the endpoints of the tunnel. For example, the tunnel identifier of tunnel 212 can include the respective IP addresses of switches 112 and 116.

Switch 112 can then relay requests 172 and 174 to switch 122. The relayed requests can retain the role information of the corresponding requesting hosts. Hence, upon receiving request 172 via tunnel 216 between switches 112 and 122, switch 122 can obtain role identifier 164 from request 172 and add role identifier 164 to role list 204 in association with a tunnel identifier of tunnel 216. Similarly, switch 122 can obtain role identifier 166 from request 174 and add role identifier 166 to role list 204 in association with a tunnel identifier of tunnel 216. Here, the entry for tunnel 216 can include role identifiers 162 and 164 since both hosts 142 and 144 are reachable via tunnel 216. Switch 122 can also obtain role identifier 164 of host 146 from request 176 and add role identifier 164 to role list 204 in association with a tunnel identifier of the tunnel between switches 122 and 132.

Since switch 128 can couple source 148, switch 128 can be the source switch and a designated router for the multicast group. Switch 122 can then relay requests 172, 174, and 176 to switch 128 via tunnel 218 between switches 122 and 128. Switch 128 can obtain role identifiers 164 and 166 from requests 172 and 174, respectively, and add role identifiers 164 and 166 to role list 206 in association with a tunnel identifier of tunnel 218. Switch 128 can also obtain role identifier 164 from request 176. However, role identifier 164 may already exist in role list 204 in association with the tunnel identifier of tunnel 218. To indicate the number of hosts associated with a respective role, role list 206 may maintain a counter for a respective role in a respective entry.

For example, in the entry for tunnel 218, role list 206 can include counters 222 and 224 indicating the number of hosts with roles 164 and 166, respectively, that are reachable via tunnel 218. When switch 128 receives request 172, switch 128 can increment counter 222 to a value of 1. Subsequently, when switch 128 receives request 176, switch 128 can increment counter 222 to a value of 2. On the other hand, when switch 128 receives request 174, switch 128 can increment counter 224 to a value of 1. Based on counters 222 and 224, switch 128 can determine whether to prune tunnel 128 from multicast tree 190. If host 142 or 146 leaves the multicast group, switch 128 can receive a corresponding route update with role identifier 164. Switch 128 can then decrement counter 222 to a value of 1. However, since counter 222 can indicate that there is at least one valid requesting host reachable via tunnel 128, switch 128 may not prune tunnel 128.

Figure 2B:
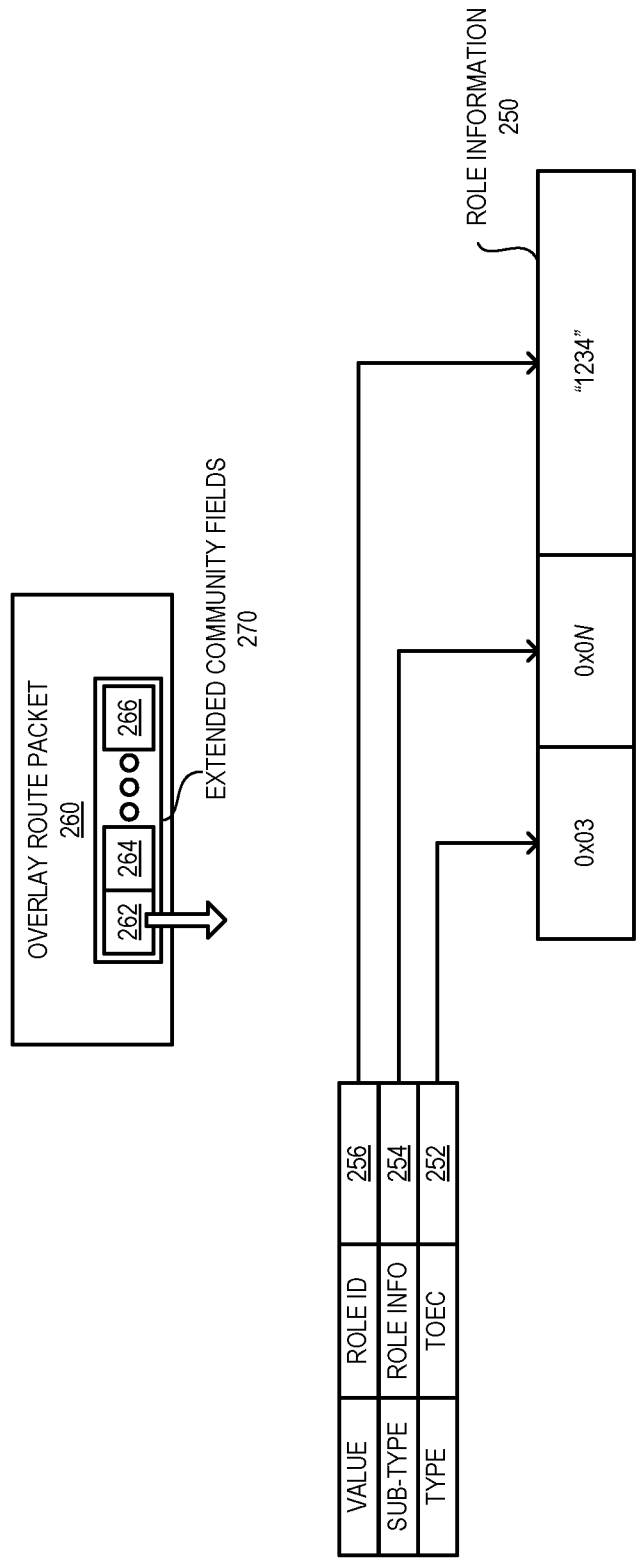
FIG. 2B illustrates an example of role information incorporated in a multicast route update, in accordance with an aspect of the present application.

FIG. 2B illustrates an example of role information incorporated in a multicast route update, in accordance with an aspect of the present application. An overlay route packet 260, such as an SMET route request or route update, can carry role identifier information. Packet 260 can include a set of fields 270 to indicate the role identifier information. Since packet 260 may comprise a list of roles of all downstream requesting hosts, community fields 270 can include a number of role information fields 262, 264, and 266. Each of community fields 270 can correspond to a downstream requesting host. Community fields 270 can represent a BGP Extended Communities Attribute, as defined in Internet Engineering Task Force (IETF) Request For Comments 4360. For example, community fields 270 can indicate Transitive Opaque Extended Community (TOEC) associated with SMET routes.

A respective role information field, such as field 262 can include a set of sub-fields representing role information 250. The set of sub-fields can include a type 252, a sub-type 254, and a value 256. Type 252 can indicate the generic type of field 262 (e.g., a TOEC field) that can be defined in accordance with the standard (e.g., the BGP Extended Communities Attribute) associated with community fields 270. Sub-type 254 can be a specialized value indicating that field 262 corresponds to role information 250. Value 256 can then indicate the value of a role identifier. Accordingly, type 252 can include a value of "0x03," which can indicate a TOEC field. Sub-type 254 can include a specialized value of "0x0N" (e.g., "0x05"). Any switch that supports sub-type 254 can recognize the specialized value and determine that field 262 includes role information 250 and can obtain the corresponding role identifier specified in value 256 (e.g., a role identifier value of "1234").

Community fields 270 can be transitive because the community can be defined to be opaque for interoperability based on TOEC. As a result, if a switch does not support sub-type 254, the regular SMET can remain operational in the network. Furthermore, since community fields 270 can be relayed upstream, the switch can relay community fields 270 to upstream switches even if the switch does not support sub-type 254. Consequently, the efficient enforcement of segmentation on multicast traffic can be deployed in a heterogeneous network with switches from different vendors. In particular, since the enforcement is ensured at the access switches of the network, the segmentation can be maintained in the network even if some of the core switches do not support the efficient enforcement of segmentation policies (i.e., do not recognize sub-type 254).

Figure 3:
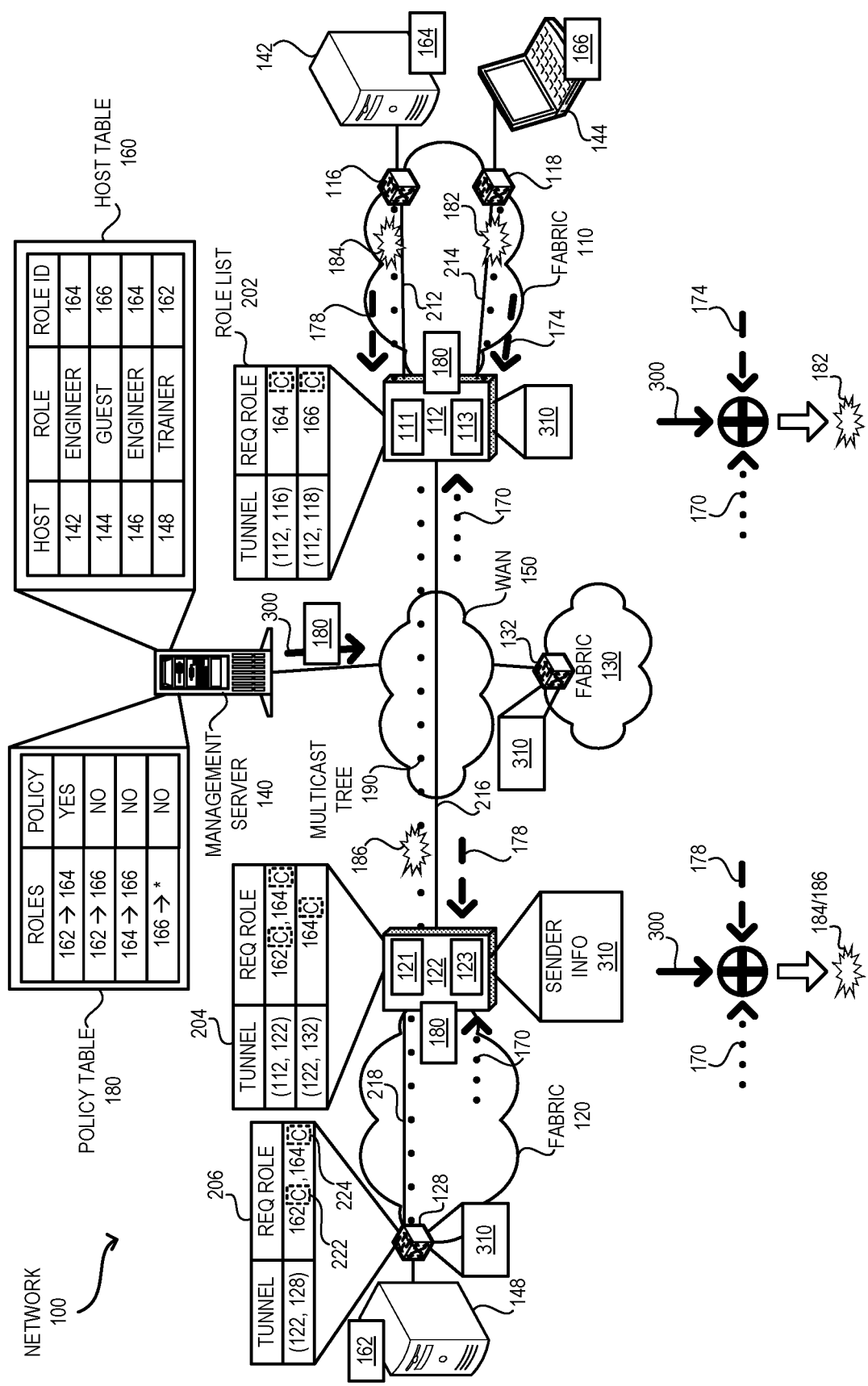
FIG. 3 illustrates examples of pruning a multicast route in an overlay network for facilitating efficient multicast traffic segmentation, in accordance with an aspect of the present application.

FIG. 3 illustrates examples of pruning a multicast route in an overlay network for facilitating efficient multicast traffic segmentation, in accordance with an aspect of the present application. Server 140 can send a notification packet 300 to gateway switches 112, 122, and 132. Packet 300 can include the content of table 180. Packet 300 can be a unicast, multicast, or broadcast packet. Switches 112, 122, and 132 can then maintain respective local instances of table 180 based on the information from packet 300. In this way, switches 112, 122, and 132 can obtain the segmentation policies of network 100. During operation, switches 112, 122, and 132 may also receive request 174, which can include role identifier 164 of host 144. Request 174 may also include roles of any other current requesting hosts, such as role identifier 166 of host 144. Based on request 174, role identifier 164 can be added to role lists 202, 204, and 206.

When switch 128 encapsulates packet 170, switch 128 can include sender information 310, which includes role identifier 162, in the encapsulation header. Upon receiving encapsulated packet 170 of the multicast group, switches 112, 122, and 132 can learn sender information 310 from the encapsulation header. Based on table 180 in packet 300, role identifier 166 in request 174, and role identifier 162 in encapsulated packet 170, a respective switch can determine any segmentation policy defined for roles 162 and 166. Accordingly, switch 112 can determine that role identifier 166 is not allowed to receive traffic from role identifier 162 and perform pruning operation 182 to remove tunnel 214 from multicast tree 190. At that moment, other switches, such as switches 122 and 128, may not identify a tunnel that can be pruned. However, when switches 112, 122, and 132 receive update 178, these switches become aware of the leaving of host 142 with role identifier 164. Based on table 180 in packet 300, role identifier 164 in update 178, and role identifier 162 in encapsulated packet 170, a respective switch can identify a tunnel via which a valid requesting host may not be reachable based on segmentation policies defined for roles 162 and 166.

Accordingly, switch 112 can determine that no requesting host is reachable via tunnel 212 and perform pruning operation 184 to remove tunnel 212 from multicast tree 190. Furthermore, switch 122 can determine that host 144 with role identifier 166 is the only host reachable via tunnel 216. Accordingly, switch 122 can determine that role identifier 166 is not allowed to receive traffic from role identifier 162 and perform pruning operation 186 to remove tunnel 216 from multicast tree 190. Hence, a respective switch can enforce the segmentation based on the policies of table 180 when the switch learns the respective roles of the requesting host and the source.

It should be noted that request 174 can be sent after encapsulated packet 170 is received at switches 112, 122, and 132. The order at which a request and a data packet are received may not dictate the capability of a switch, such as switch 112, to prune the multicast tree. When switch 112 learns role identifier 166 of host 144 and role identifier 148 of source 148, switch 112 can compare these roles with the local instance of table 180 and determine that tunnel 214 can be pruned from multicast tree 190. For the same reason, based on update 178, switches 112 and 122 can prune tunnels 212 and 216, respectively, even when switches 112 and 122 have forwarded encapsulated packet 170 via these tunnels. In other words, a respective switch can determine whether a tunnel can be pruned based on periodic checking or a trigger condition. The trigger condition can include receiving one of: a route request, a route update, and a data packet.

Figure 4A:
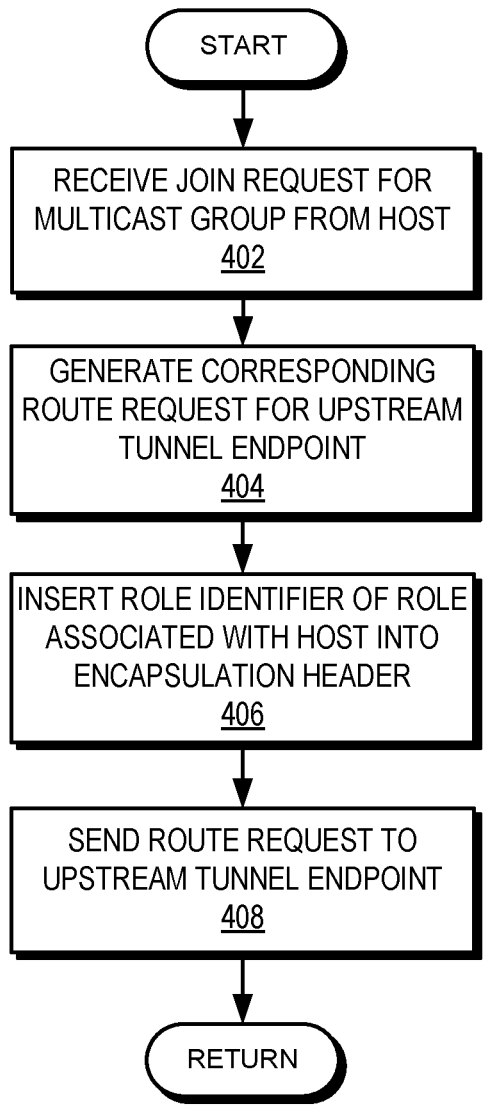
FIG. 4A presents a flowchart illustrating the process of a switch sending an overlay route request associated with a multicast group in an overlay network, in accordance with an aspect of the present application.

FIG. 4A presents a flowchart illustrating the process of a switch sending an overlay route request associated with a multicast group in an overlay network, in accordance with an aspect of the present application. During operation, the switch can receive a join request for a multicast group from the host (operation 402) and generate a corresponding route request for an upstream tunnel endpoint (operation 404). The switch can then insert the role identifier of a role associated with the host into the encapsulation header (operation 406). The switch can send the route request to the upstream tunnel endpoint (operation 408).

Figure 4B:
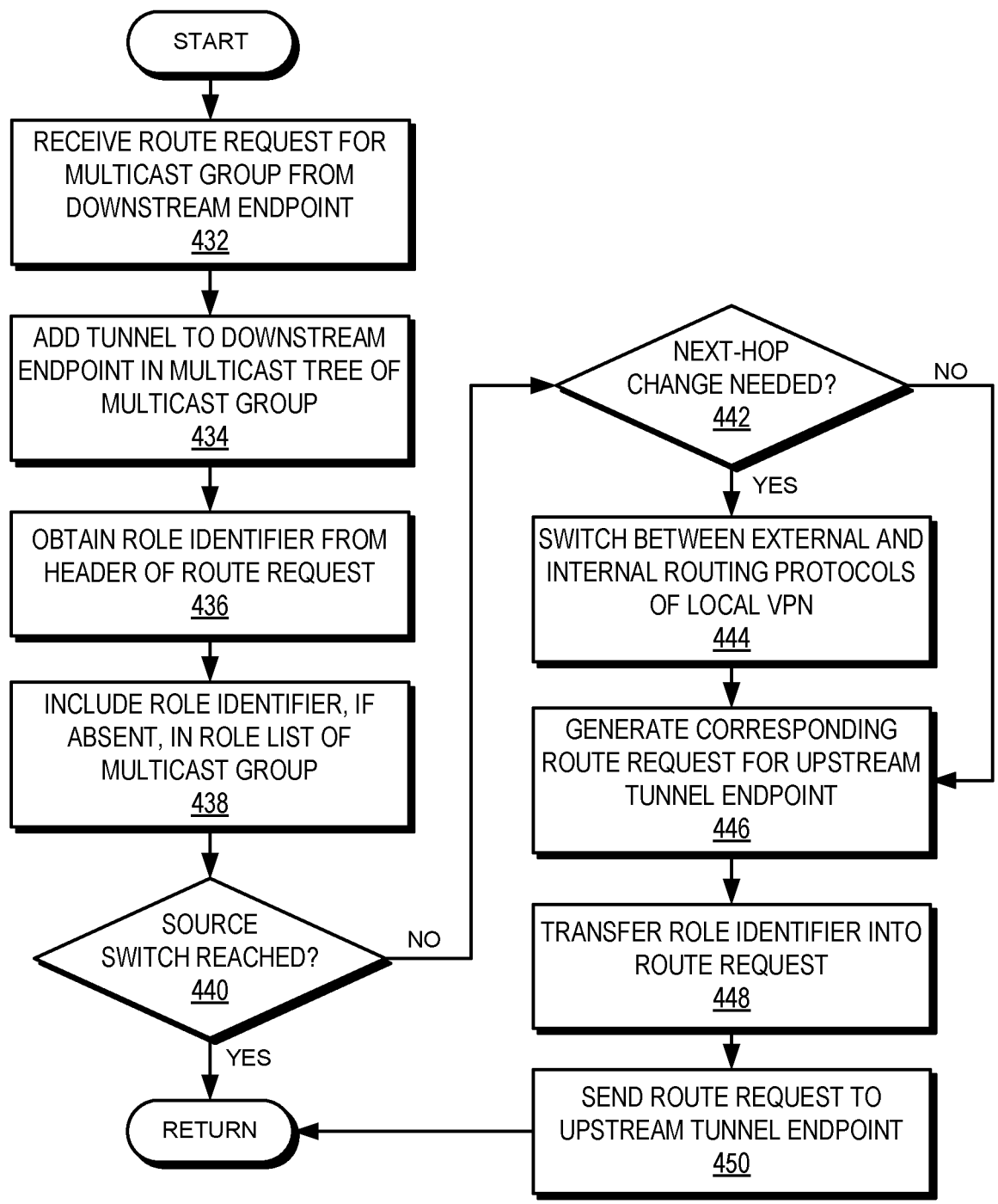
FIG. 4B presents a flowchart illustrating the process of a switch processing and forwarding an overlay route request associated with a multicast group in an overlay network, in accordance with an aspect of the present application.

FIG. 4B presents a flowchart illustrating the process of a switch processing and forwarding an overlay route request associated with a multicast group in an overlay network, in accordance with an aspect of the present application. During operation, the switch can receive a route request for a multicast group from a downstream endpoint (operation 432) and add the tunnel to the downstream endpoint in the multicast tree of the multicast group (operation 434). The switch can then obtain a role identifier from the header of the route request (operation 436) and include the role identifier, if absent, in the role list of the multicast group (operation 438). The switch can then determine whether the source switch is reached (operation 440).

If the source switch is not reached, the switch can determine whether a next-hop change is needed (operation 442). If a next-hop change is needed, the switch can switch between the external and internal routing protocols of a local VPN (operation 444). On the other hand, if a next-hop change is not needed (operation 442) or the routing protocols are switches (operation 444), the switch can generate a corresponding route request for the upstream tunnel endpoint (operation 446). The switch can then transfer the role identifier into the route request (operation 448) and send the route request to the upstream tunnel endpoint (operation 450).

Figure 4C:
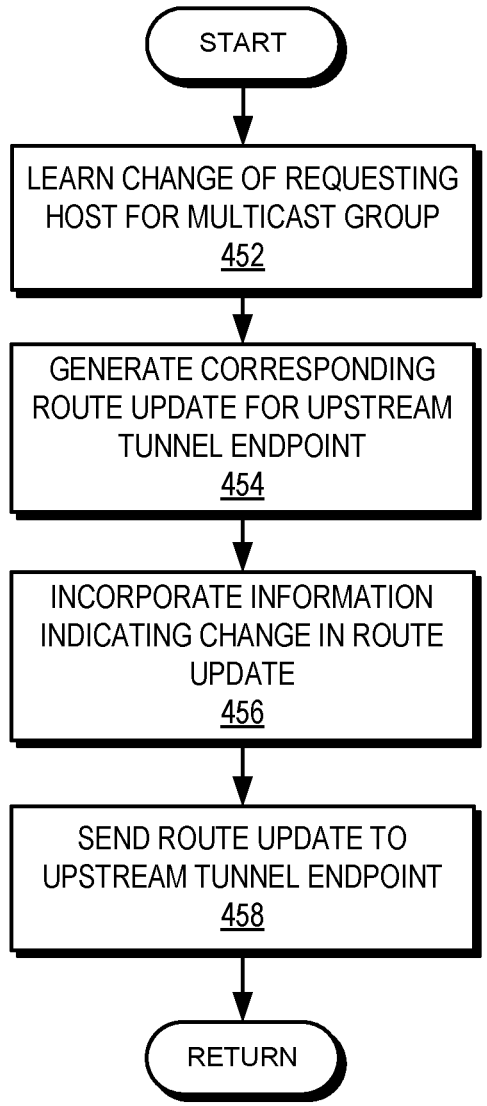
FIG. 4C presents a flowchart illustrating the process of a switch generating an overlay route update associated with a multicast group in an overlay network, in accordance with an aspect of the present application.

FIG. 4C presents a flowchart illustrating the process of a switch generating an overlay route update associated with a multicast group in an overlay network, in accordance with an aspect of the present application. During operation, the switch can learn the change of a requesting host for a multicast group (operation 452). For example, the host may send a leave request for leaving the multicast group. The switch can generate a corresponding route update for an upstream tunnel endpoint (operation 454) and incorporate information indicating a change in the route update (operation 456). The switch can then send the route update to the upstream tunnel endpoint (operation 458).

Figure 5A:
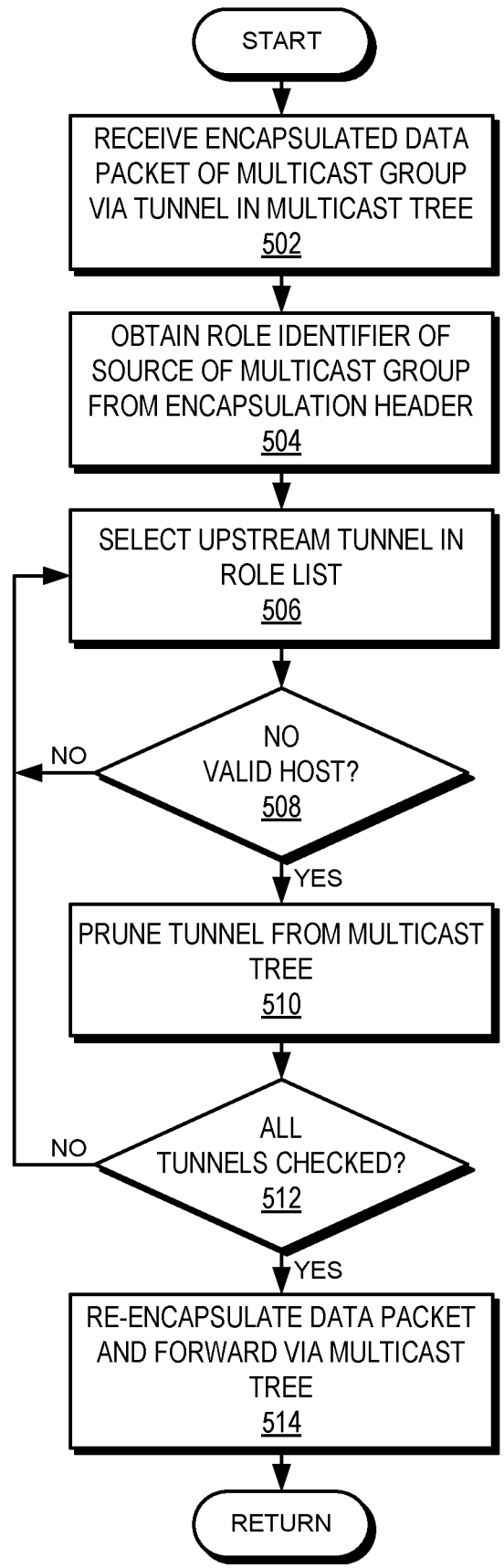
FIG. 5A presents a flowchart illustrating the process of a switch pruning a multicast route in an overlay network based on a data packet, in accordance with an aspect of the present application.

FIG. 5A presents a flowchart illustrating the process of a switch pruning a multicast route in an overlay network based on a data packet, in accordance with an aspect of the present application. During operation, the switch can receive an encapsulated data packet of a multicast group via a tunnel in the multicast tree (operation 502). The switch can determine can obtain the role identifier of the source of the multicast group from the encapsulation header (operation 504). The switch may, optionally, store the role identifier in a local data structure. The switch can then select an upstream tunnel in the role list (operation 506).

The switch can then determine whether no host reachable via the tunnel is a valid requesting host (operation 508). To do so, the switch may determine whether the hosts are allowed to receive traffic from the role identifier. If no host is a valid requesting host, the switch can prune the tunnel from the multicast tree (operation 510). Subsequently, the switch can determine whether all tunnels in the role list are checked (operation 512). If at least one host is a valid requesting host (operation 508) or all tunnels are not checked (operation 512), the switch can continue to select an upstream tunnel in the role list (operation 506). On the other hand, if all tunnels are checked, the switch can re-encapsulate the data packet and forward it via the multicast tree (operation 514).

Figure 5B:
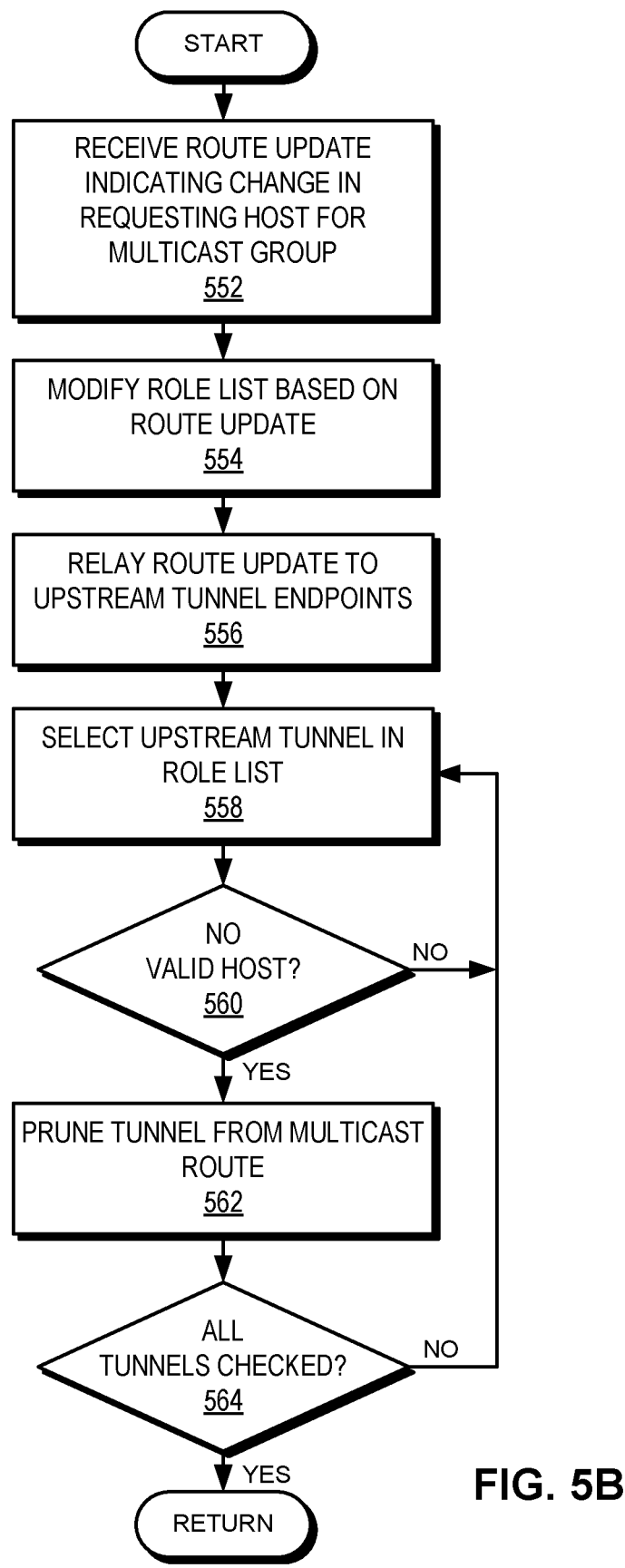
FIG. 5B presents a flowchart illustrating the process of a switch pruning a multicast route in an overlay network based on a route update, in accordance with an aspect of the present application.

FIG. 5B presents a flowchart illustrating the process of a switch pruning a multicast route in an overlay network based on a route update, in accordance with an aspect of the present application. During operation, the switch can receive a route update indicating a change in the requesting host for the multicast group (operation 502). For example, the host may send a leave request for leaving the multicast group. The switch can then modify the role list based on the route update (operation 554). The switch can also relay the route update to the upstream tunnel endpoints (operation 556). The switch can then select an upstream tunnel in the role list (operation 558).

The switch can then determine whether no host reachable via the tunnel is a valid requesting host (operation 560). If no host is a valid requesting host, the switch can prune the tunnel from the multicast tree (operation 562). Subsequently, the switch can determine whether all tunnels in the role list are checked (operation 564). If at least one host is a valid requesting host (operation 560) or all tunnels are not checked (operation 564), the switch can continue to select an upstream tunnel in the role list (operation 558).

Figure 6:
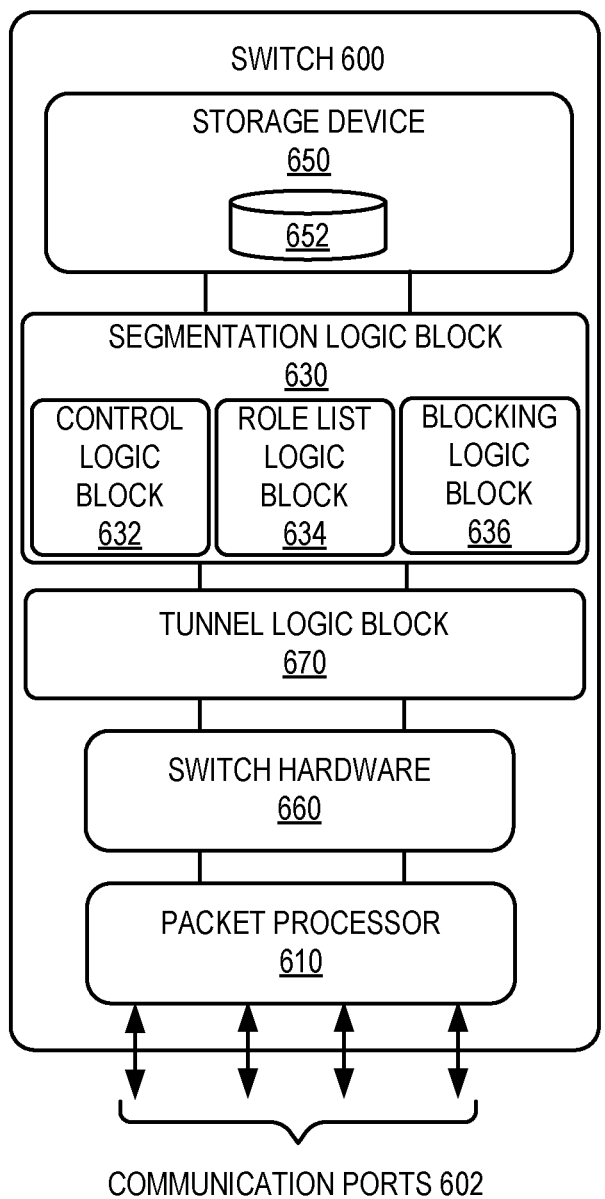
FIG. 6 illustrates an example of a switch supporting efficient multicast traffic segmentation in an overlay network, in accordance with an aspect of the present application.

FIG. 6 illustrates an example of a switch supporting efficient multicast traffic segmentation in an overlay network, in accordance with an aspect of the present application. In this example, a switch 600 can include a number of communication ports 602, a packet processor 610, and a storage device 650. Switch 600 can also include switch hardware 660 (e.g., processing hardware of switch 600, such as its ASIC chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Database 652 may store the local role list and an instance of a policy table of the local network. Switch 600 can include a tunnel logic block 670 that can establish a tunnel with a remote switch, thereby allowing switch 600 to operate as a tunnel endpoint. Switch 600 can include a segmentation logic block 630 that can allow switch 600 to efficiently enforce policy-based segmentation. Segmentation logic block 630 can maintain the instance of the policy table. Segmentation logic block 630 can include a control logic block 632, a role list logic block 634, and a blocking logic block 636.

Control logic block 632 can include the role identifier of a host in the encapsulation header of a control packet, such as a route update or a route request. Control logic block 632 can also learn a role identifier of a requesting host from the encapsulation header of a received control packet. Control logic block 632 can further learn a role identifier of the source of a multicast group from the encapsulation header of a received data packet. Role list logic block 634 can generate or populate a role list for a respective ingress tunnel of a control packet based on one or more role identifiers learned from the control packet. Blocking logic block 636 can prune a tunnel from a multicast tree if no valid requesting host is reachable via the tunnel. To do so, blocking logic block 636 may prevent switch 600 from programing the tunnel in switch hardware 660.

One aspect of the present technology can provide a system for efficient enforcement of a set of segmentation policies at a gateway switch of a network. During operation, the gateway switch can receive a first message associated with a multicast join request for a multicast group from a host. The header of the first message can indicate a first role of the host. The gateway switch can also receive a second message comprising data traffic of the multicast group from a source of the multicast group. The header of the second message can indicate a second role of the source. Here, a set of segmentation policies can indicate which other roles are allowed to communicate with a respective role; and a respective role can indicate a set of privileges in the network for a device associated with the role. Based on the first and second roles and a corresponding segmentation policy in the set of segmentation policies, the system can then determine whether the host is allowed to receive the data traffic from the source. If the host is not allowed to receive the data traffic, the system can prevent the second message from being forwarded to the host from the gateway switch.

In a variation on this aspect, the system can relay the first message to a remote gateway of a remote network. The message can be received based on an internal Border Gateway Protocol (iBGP) and relayed based on an external BGP (eBGP).

In a variation on this aspect, the network can be a distributed tunnel fabric. The first message can then include a route request indicating the join request in the distributed tunnel fabric and can be encapsulated with a tunnel header that includes a role identifier associated with the first role.

In a variation on this aspect, the first message can be received from a remote switch coupling the host. The system can then add a route from the remote switch to a multicast tree of the multicast group.

In a further variation, the system can add a role identifier of the role to a role list associated with the route and the multicast group. The role list can indicate a corresponding role of a respective host requesting traffic from the multicast group reachable via the route.

In a further variation, the system can remove a third role from the role list upon receiving, via the route, a third message associated with a multicast leave request for the multicast group. The header of the third message can indicate the third role. The system can then determine, based on the set of segmentation policies and the role list, whether any host, which is requesting traffic from the multicast group and is reachable via the route, is allowed to receive traffic from the source. If no host reachable via the route is allowed to receive traffic from the source, the system can prune the route from the multicast tree.

In a further variation, the system can prevent the second message from being forwarded by pruning the route from the multicast tree. The system can determine, based on the set of segmentation policies, whether any host, which is requesting traffic from the multicast group and is reachable via the route, is allowed to receive traffic from the source. If no host reachable via the route is allowed to receive traffic from the source, the system can perform the pruning of the route from the multicast tree.

In a further variation, the system can maintain the route in the multicast tree in a piece of software of the gateway switch. The system can then prune the route from the multicast tree by precluding the gateway switch from programming the route in forwarding hardware of the multicast tree.

In a variation on this aspect, if the host is allowed to receive the data traffic based on the corresponding segmentation policy, the system can allow the gateway switch to forward the second message to the host from the gateway switch.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
receiving, by a gateway switch of a network, a first message associated with a multicast join request for a multicast group from a host, wherein a header of the first message indicates a first role of the host, wherein the first message is received from a remote switch coupling the host;
adding a route from the remote switch to a multicast tree of the multicast group; and
adding a role identifier of the first role to a role list associated with the route and the multicast group, wherein the role list indicates a corresponding role of a respective host requesting traffic from the multicast group reachable via the route;
receiving, by the gateway switch, a second message comprising data traffic of the multicast group from a source of the multicast group, wherein a header of the second message indicates a second role of the source, wherein a set of segmentation policies indicate which other roles are allowed to communicate with a respective role, and wherein a respective role indicates a set of privileges in the network for a device associated with the respective role;
determining, based on the first and second roles and a corresponding segmentation policy in the set of segmentation policies, whether the host is allowed to receive the data traffic from the source;
in response to determining that the host is not allowed to receive the data traffic, preventing the second message from being forwarded to the host from the gateway switch.

2. The method of claim 1, further comprising relaying the first message to a remote gateway switch via an inter-fabric tunnel between the gateway switch and the remote gateway switch, wherein the first message is received based on an internal Border Gateway Protocol (IBGP) and relayed based on an external BGP (eBGP).

3. The method of claim 1, wherein the network is a distributed tunnel fabric, wherein the first message includes a route request indicating the join request in the distributed tunnel fabric, and wherein the first message is encapsulated with a tunnel header that includes a role identifier associated with the first role.

4. The method of claim 1, further comprising:
removing a third role from the role list in response to receiving, via the route, a third message associated with a multicast leave request for the multicast group, wherein a header of the third message indicates the third role;
determining, based on the set of segmentation policies and the role list, whether any host, which is requesting traffic from the multicast group and is reachable via the route, is allowed to receive traffic from the source; and
in response to determining that no host reachable via the route is allowed to receive traffic from the source, pruning the route from the multicast tree.

5. The method of claim 1, wherein preventing the second message from being forwarded further comprises:
determining, based on the set of segmentation policies, whether any host, which is requesting traffic from the multicast group and is reachable via the route, is allowed to receive traffic from the source; and
in response to determining that no host reachable via the route is allowed to receive traffic from the source, pruning the route from the multicast tree.

6. The method of claim 5, further comprising maintaining the route in the multicast tree in a piece of software of the gateway switch;
wherein pruning the route from the multicast tree further comprises precluding the gateway switch from programming the route in forwarding hardware of the multicast tree.

7. The method of claim 1, wherein, in response to determining that the host is allowed to receive the data traffic based on the corresponding segmentation policy, the method further comprises forwarding the second message to the host from the gateway switch.

8. A non-transitory computer-readable storage medium storing instructions that when executed by a processor of a gateway switch of a network cause the processor to perform a method, the method comprising:
receiving a first message associated with a multicast join request for a multicast group from a host, wherein a header of the first message indicates a first role of the host, wherein the first message is received from a remote switch coupling the host;

adding a route from the remote switch to a multicast tree of the multicast group;
adding a role identifier of the first role to a role list associated with the route and the multicast group, wherein the role list indicates a corresponding role of a respective host requesting traffic from the multicast group reachable via the route;
receiving a second message comprising data traffic of the multicast group from a source of the multicast group, wherein a header of the second message indicates a second role of the source, wherein a set of segmentation policies indicate which other roles are allowed to communicate with a respective role, and wherein a respective role indicates a set of privileges in the network for a device associated with the respective role;
determining, based on the first and second roles and a corresponding segmentation policy in the set of segmentation policies, whether the host is allowed to receive the data traffic from the source; and
in response to determining that the host is not allowed to receive the data traffic, preventing the second message from being forwarded to the host from the gateway switch.

9. The non-transitory computer-readable storage medium of claim 8, wherein the method further comprises relaying the first message to a remote gateway switch via an inter-fabric tunnel between the gateway switch and the remote gateway switch, wherein the first message is received based on an internal Border Gateway Protocol (IBGP) and relayed based on an external BGP (eBGP).

10. The non-transitory computer-readable storage medium of claim 8, wherein the network is a distributed tunnel fabric, wherein the first message includes a route request indicating the join request in the distributed tunnel fabric, and wherein the first message is encapsulated with a tunnel header that includes a role identifier associated with the first role.

11. The non-transitory computer-readable storage medium of claim 8, wherein the method further comprises:
removing a third role from the role list in response to receiving, via the route, a third message associated with a multicast leave request for the multicast group, wherein a header of the third message indicates the third role;
determining, based on the set of segmentation policies and the role list, whether any host, which is requesting traffic from the multicast group and is reachable via the route, is allowed to receive traffic from the source; and
in response to determining that no host reachable via the route is allowed to receive traffic from the source, pruning the route from the multicast tree.

12. The non-transitory computer-readable storage medium of claim 8, wherein preventing the second message from being forwarded further comprises:
determining, based on the set of segmentation policies, whether any host, which is requesting traffic from the multicast group and is reachable via the route, is allowed to receive traffic from the source; and
in response to determining that no host reachable via the route is allowed to receive traffic from the source, pruning the route from the multicast tree.

13. The non-transitory computer-readable storage medium of claim 12, wherein the method further comprises maintaining the route in the multicast tree in a piece of software of the gateway switch;
wherein pruning the route from the multicast tree further comprises precluding the gateway switch from programming the route in forwarding hardware of the multicast tree.

14. The non-transitory computer-readable storage medium of claim 8, wherein, in response to determining that the host is allowed to receive the data traffic based on the corresponding segmentation policy, the method further comprises forwarding the second message to the host from the gateway switch.

15. A computer system, comprising:
a processor;
a memory device; and
control circuitry to facilitate a control logic block, a blocking logic block, and a list logic block;
wherein the control logic block is to:
receive a first message associated with a multicast join request for a multicast group from a host, wherein a header of the first message indicates a first role of the host; and
receive a second message comprising data traffic of the multicast group from a source of the multicast group, wherein a header of the second message indicates a second role of the source, wherein a set of segmentation policies indicate which other roles are allowed to communicate with a respective role, and wherein a respective role indicates a set of privileges in the network for a device associated with the respective role;
wherein the blocking logic block is to:
determine, based on the first and second roles and a corresponding segmentation policy in the set of segmentation policies, whether the host is allowed to receive the data traffic from the source; and
in response to determining that the host is not allowed to receive the data traffic, prevent the second message from being forwarded to the host from the gateway switch; and
wherein the list logic block is to:
add a role identifier of the first role to a role list associated with a route of the network and the multicast group, wherein the role list indicates a corresponding role of a respective host requesting traffic from the multicast group reachable via the route.

* * * * *